United States Patent [19]
Ono et al.

[11] Patent Number: 5,210,781
[45] Date of Patent: May 11, 1993

[54] ROTARY ANODE TYPE X-RAY TUBE HAVING A JACKET TO PREVENT LUBRICANT FROM BEING SCATTERED

[75] Inventors: Katsuhiro Ono, Utsunomiya; Hidero Anno; Hiroyuki Sugiura, both of Ootawara; Takayuki Kitami, Tochigi; Hiroaki Tazawa, Ootawara, all of Japan

[73] Assignee: Kabushiki Kaisha Toshiba, Kawasaki, Japan

[21] Appl. No.: 767,652

[22] Filed: Sep. 30, 1991

[30] Foreign Application Priority Data

Oct. 5, 1990 [JP] Japan .................. 2-266267
Nov. 28, 1990 [JP] Japan .................. 2-323284

[51] Int. Cl.⁵ .............................. H01J 35/10
[52] U.S. Cl. ...................... 378/125; 378/132; 378/133; 378/143; 378/144
[58] Field of Search .......... 378/133, 132, 125, 143, 378/144

[56] References Cited

U.S. PATENT DOCUMENTS

| | | | |
|---|---|---|---|
| 4,210,371 | 7/1980 | Gerkema et al. | 378/133 |
| 4,641,332 | 2/1987 | Gerkema | 378/125 |
| 4,644,577 | 2/1987 | Gerkema et al. | 378/133 |
| 4,677,651 | 6/1987 | Hartl et al. | 378/132 |
| 4,856,039 | 8/1989 | Roelandse et al. | 378/133 |
| 5,068,885 | 11/1991 | Vetter | 378/133 |
| 5,077,775 | 12/1991 | Vetter | 378/132 |

FOREIGN PATENT DOCUMENTS

| | | |
|---|---|---|
| 0141475 | 5/1985 | European Pat. Off. |
| 373705 | 6/1990 | European Pat. Off. |
| 378273 | 7/1990 | European Pat. Off. |
| 378274 | 7/1990 | European Pat. Off. |

OTHER PUBLICATIONS

"The 'Push-Pull' Spiral-Groove Bearing-a Thrust Bearing with Self-Adjusting Internal Preloading", Philips tech. Rev. 35, 11-14, 1975, No. 1; H. J. W. M. Volman.

Primary Examiner—David P. Porta
Assistant Examiner—Kim-Kwok Chu
Attorney, Agent, or Firm—Cushman, Darby & Cushman

[57] ABSTRACT

A rotary X-ray tube of the anode type wherein a jacket which serves to prevent lubricant from being scattered into the space in a vacuum envelope is attached to at least one of a rotary structure to which an anode target is fixed and a stationary structure for holding the rotating body, enclosing a clearance opening which forms a border relative to the space in the vacuum envelope.

7 Claims, 12 Drawing Sheets

ROTARY ANODE TYPE X-RAY TUBE HAVING A JACKET TO PREVENT LUBRICANT FROM BEING SCATTERED

BACKGROUND OF THE INVENTION

1. Field of the Invention

The present invention relates to a rotary anode type X-ray tube and, more particularly, an improvement of the rotary mechanism in the rotary anode type X-ray tube.

2. Description of the Related Art

As is known, in a rotary-anode type X-ray tube, a disk-like anode target is supported by a rotary structure and a stationary shaft which have a bearing portion therebetween, and an electron beam emitted from a cathode is radiated on the anode target while the anode target is rotated at a high speed by energizing an electromagnetic coil arranged outside a vacuum envelope, thus irradiating X-rays. The bearing portion is constituted by a roller bearing, such as a ball bearing, or a hydrodynamic pressure type sliding bearing which has bearing surfaces with spiral grooves and uses a metal lubricant consisting of, e.g., gallium (Ga) or a gallium-indium-tin (Ga-In-Sn) alloy, which is liquified during an operation. Rotary-anode type X-ray tubes using the latter bearing are disclosed in, e.g., Published Examined Japanese Patent Application No. 60-21463 and Published Unexamined Japanese Patent Application Nos. 60-113817, 60-117531, and 2-244545.

In the rotary anode type X-ray tube provided with one of the hydrodynamic pressure type slide bearings disclosed in the above-mentioned gazettes and in which the liquid metal lubricant is used, a clearance between the rotary and the stationary structures is inevitably opened and communicated with a space in a vacuum envelope so that the liquid metal lubricant may be leaked into the space in the vacuum envelope through the opening. When the liquid metal lubricant is leaked from the bearing section, it becomes insufficient in volume in the bearing section. Thus, stable dynamic pressure type bearing operation cannot be maintained for a long time. When the liquid metal lubricant is scattered into the space in the vacuum envelope, the withstanding voltage property of the X-ray tube is remarkably damaged.

In order to prevent these damages, the abovementioned Japanese Patent Disclosure No. 2-244545 discloses that rare metal film which is made wet with the lubricant to form a mixed phase or alloy is formed on those surfaces of stationary and rotary structures, which are faced to each other. However, in this arrangement the liquid metal lubricant leaked from the bearing section is concentrated on corners of a clearance between the stationary and the rotary structures by centrifugal force, and deposited thereon and alloyed therewith. When the liquid metal lubricant is accumulated at the corners of the clearance in this manner, the clearance is made smaller and smaller by the lubricant thus accumulated, thereby causing the rotor cylinder not to be rotated. Further, the clearance between the stationary and the rotary structures is shaped like a simple L when sectioned in half and this makes it easy for the liquid metal lubricant to be leaked and scattered into the space in the vacuum container, passing through the clearance.

SUMMARY OF THE INVENTION

The object of the present invention is therefore to provide a rotary anode type X-ray tube capable of more reliably preventing a liquid metal lubricant from being leaked from a bearing section and scattered into a space in the vacuum envelope and maintaining the reliable dynamic pressure type bearing operation for a long time period.

According to the present invention, there can be provided a rotary anode type X-ray tube wherein a jacket which serves to prevent the liquid metal lubricant from being scattered into the space in the vacuum envelope is attached to at least one of rotary and stationary structures, enclosing that opening of a small clearance between the rotary and the stationary structures which forms a border between the clearance at the slide bearing section and the space in the vacuum envelope.

According to the present invention, the liquid metal lubricant, even if leaked from the bearing section, can be caught in the jacket and more reliably prevented from being scattered outside into the space in the vacuum envelope of the X-ray tube. Therefore, a more stable operation of the dynamic pressure type slide bearing can be guaranteed over a longer time period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described with reference to the accompanying drawings. Same component parts of these embodiment will be denoted by same reference numerals.

Figure 1:
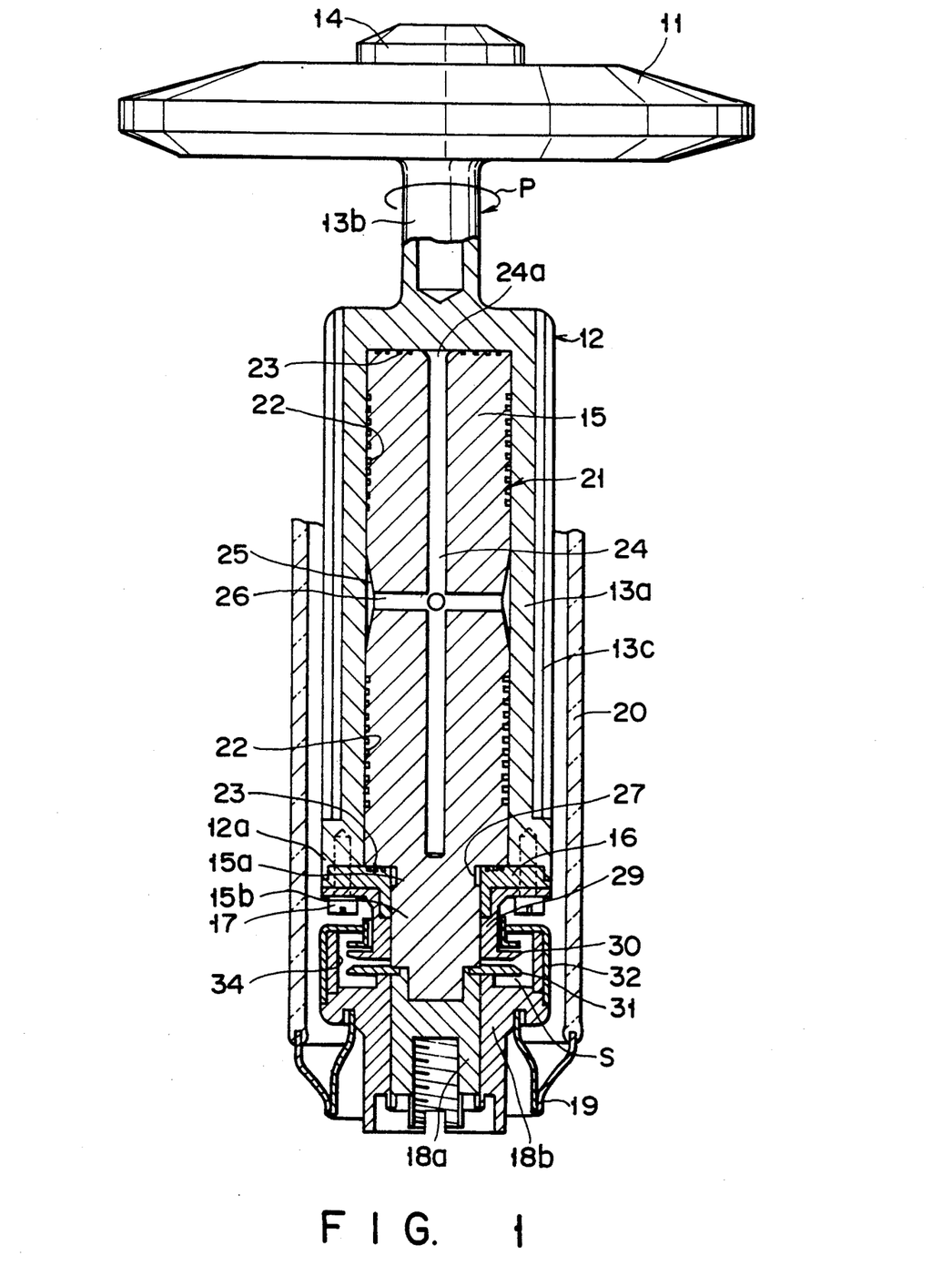
FIG. 1 is a vertically-sectioned view showing the main portion of the rotary anode type X-ray tube according to an embodiment of the present invention.
Figure 2:
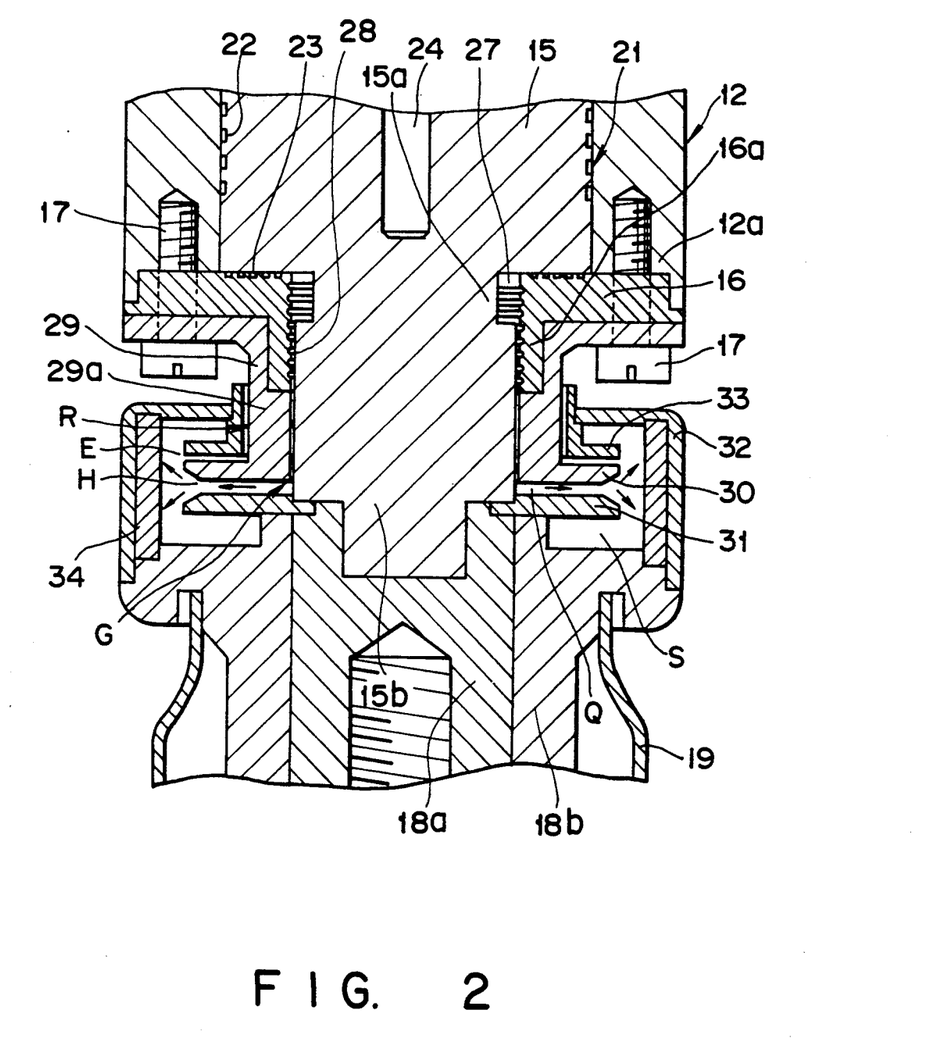
FIG. 2 is an enlarged sectional view showing a part of the rotary anode type X-ray tube shown in FIG. 1.

FIGS. 1 and 2 show rotary anode type X-ray tube according an embodiment of the present invention. In the X-ray tube shown in FIGS. 1 and 2, a disk-like anode target 11 made of heavy metal is fixed to an end of a rotary structure 12. The rotary structure 12 comprises a inner cylinder 13a having a bottom section, a rotating shaft 13b projected from the inner cylinder 13a, and a rotary cylinder 13c which includes iron and copper cylinders fixedly fitted onto the inner cylinder 13a. The anode target 11 is fixed to the rotating shaft 13b by a fixing nut 14. A column-like stationary structure 15 is inserted into the inner cylinder 13a of the rotary structure 12 through an opening 12a thereof and held there coaxial to the cylinder 13a. The stationary structure 15 has a small-diameter portion 15a at the bottom end thereof which is adjacent to the opening 12a of the rotating body 12. A closing ring 16 which encloses the small-diameter portion 15a of the stationary structure 15 is fixed to the opening 12a of the rotary structure 12 by a plurality of bolts 17 to substantially close the opening 12a. A portion 15b is further extended from the small-diameter portion 15a of the stationary structure 15 along the center axis of the stationary structure 15 and an anode support 18a made of iron and serving to mechanically support the rotary and stationary structures 12 and 15 is welded to the extended portion 15b of the stationary structure 15. An auxiliary support 18b is further welded to it and then vacuum-tightly connected to a glass vacuum envelope 20 by a sealing metal ring 19. These anode and auxiliary supports 18a and 18b substantially form a part of the extended portion 15b of the stationary structure 15.

The inner and outer surfaces of the rotary and stationary structures 12 and 15 which face each other when the stationary structure 15 is inserted into the rotary structure 12, form such a hydrodynamic pressure slide bearing section 21 in radial and thrust directions as disclosed in the above-mentioned Official Gazettes. Spiral grooves 22 and 23 each having a herringbone pattern as disclosed in the above-mentioned Official Gazettes are formed on the outer circumference and the end face of the stationary structure 15 and the inner face of the closing ring 16 which serve as bearing surfaces on the side of the stationary structure. Bearing surfaces of the rotary structure 12 which face those of the stationary structure 15 may be made flat and smooth or they may be provided with spiral grooves if needed. The bearing surfaces having the spiral grooves 22 and 23 on the side of the stationary structure and those on the side of the rotary structure which form the slide bearing section 21 are faced each other with a clearance of about 20 micro-meters interposed between them. The stationary structure 15 is provided with a lubricant chamber 24 extending in the stationary structure 15 along the longitudinal center axis thereof. The opening of the lubricant chamber 24 in the stationary structure 15 is communicated with the clearance of the thrust bearing. The intermediate portion of the stationary structure 15 is a little tapered to form another small diameter portion 25 and provided with four passages 26 extending, symmetrical to the center axis of the stationary structure 15, from the lubricant chamber 24 to its small-diameter portion 25 in the radial direction and having an angle of 90° between the adjacent ones. The clearance and the lubricant chamber 24 and the passages 26 communicated with the clearance are applied with a liquid metal lubricant. Further, a circumferential groove 27 is formed on the small-diameter portion 15a of the stationary structure 15 along the inner circumference of the closing ring 16.

The closing ring 16 has a cylindrical portion 16a which is positioned to enclose the small-diameter and extended portions 15a and 15b of the stationary structure 15 and a spiral groove 28 for pumping the lubricant is formed on the inner circumference of this cylindrical portion 16a of the closing ring 16. The spiral groove 28 extends predetermined distance over the outer circumference of the small-diameter and extended portions 15a and 15b in the axial direction of the stationary structure 15. The spiral groove 28 serves to push back the lubricant leaked therein by the rotation P of the rotary structure 12. That is, the spiral groove 28 forms a first means for preventing the lubricant from being leaked outside. Further, an auxiliary rotating cylinder 29 shaped like a fallen U when sectioned in half is positioned under the closing ring 16 and fixed together with this closing ring 16 to the bottom end of the rotary structure 12 by the above-mentioned plurality bolts 17. It is preferable that the auxiliary rotating cylinder 29 is made of material such as titanium dioxide (TiO$_2$) or silicon nitride (Si$_3$N$_4$) which allow the auxiliary rotating cylinder 29 not to be made wet by the liquid metal lubricant but to repel it. The extended portion 15b of the stationary structure 15 is inserted in a cylindrical portion 29a of the auxiliary rotating cylinder 29 with a small clearance interposed between them. If the lubricant should leak out of the clearance between the cylindrical portion 16a of the closing ring 16 and the extended portion 15b of the stationary structure 15, the lubricant can be repelled to the closing ring 16 by the auxiliary rotating cylinder 29 to prevent the lubricant from being leaked outside. The auxiliary rotating cylinder 29 forms, therefore, a second means for preventing the lubricant from being leaked outside. The clearance between the cylindrical portions 16a and 29a and the extended portion 15b has a dimension range of 30-100 micro-meters. The opening G of the small clearance present at the two lubricant leakage preventing means or between the extended portion 15b and the cylindrical portion 29a border for substantially partitioning the clearance at the slide bearing section 21 from the space in the vacuum envelope.

A flange 30 extends from the bottom of the auxiliary rotating cylinder 29 in a direction perpendicular to the center axis of the X-ray tube. A ring plate 31 having a same outer diameter as that of the flange 30 is so held and fixed to the extended portion 15b and the anode supports 18a, 18b as to face the flange 30 in and parallel with the flange 30. This ring plate 31 is also made of such a material that repels the liquid metal lubricant. A ring-like jacket 32 is fixedly welded to the outer rim of the anode support 18b, enclosing the cylindrical portion 29a, the flange 30 and the ring plate 31. An auxiliary jacket ring 33 shaped like L when sectioned in half is fixed to a opening section of the jacket 32 in such a way that it is positioned near and separated from outer circumferences of the flange 30 and the cylindrical portion 29a, so that a small clearance R can be formed between them. The space inside the jacket 32 and the auxiliary jacket ring 33 forms a relatively large ring-like hollow space S. In order to make the assembly of the X-ray tube easy, the jacket 32 is previously prepared as two halves divided in the radial direction thereof and these two halves are combined with each other to form the jacket 32 when the X-ray tube is to be assembled.

A porous matter 34 made of such a material that easily reacts to the liquid metal lubricant is fixedly housed in the hollow portion inside the jacket 32, extending along the inner circumference of the jacket 32. The porous matter 34 can be made by netting gold-plated wires into a ring form or by a ring-like block having pores, for example. An outer opening H of a passage Q which extends between the flange 30 and the ring plate 31 in the radial direction is shaped like a unfolded fan and faced relative to the porous matter 34 in the hollow portion of the jacket 32 with a relatively large clearance interposed between them. If the lubricant should leak through the opening G of the clearance between the auxiliary rotating cylinder 29 and the extended portion 15b, it can be passed through the passage Q between the flange 30 and the ring plate 31 and scattered into the hollow portion inside the jacket 32 through the outer opening H of the passage Q, particularly against the porous matter 34 positioned to face the outer opening H of the passage Q with a certain interval interposed between them, due to centrifugal force caused by the flange 30 which rotates together with the rotary structure 12 at high speed. The lubricant can be thus stuck to and caught by the inner circumference of the porous matter 34. An opening E of the clearance R between the flange 30 and the auxiliary jacket ring 33 is communicated with the hollow portion in the jacket 32. The opening E has a small opening area in the hollow portion inside the jacket 32, and if the lubricant is present in the hollow portion inside the jacket 32, the lubricant is prevented from being scattered into the space in the vacuum envelope from the opening E of the clearance P through the clearance R. This makes it unnecessary to worry about the possibility that the liquid metal lubricant in the bearing section is leaked into the space in the vacuum envelope.

Figure 3:
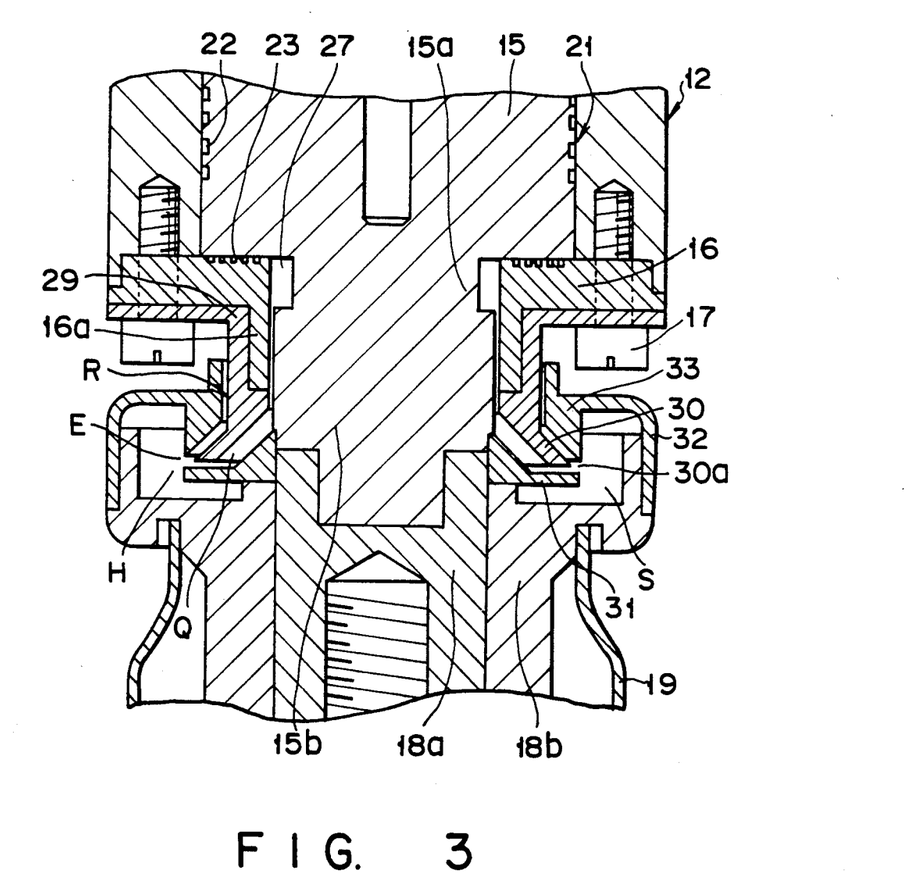
FIG. 3 is an enlarged sectional view showing a main portion of the rotary anode type X-ray tube according to another embodiment of the present invention.

FIG. 3 shows a rotary anode type X-ray tube according to another embodiment of the present invention. In the X-ray tube shown in FIG. 3, the flange 30 of auxiliary rotating cylinder 29 is shaped in an unfolded fan, extending into the hollow portion S inside the jacket while becoming wider and wider in diameter as it comes nearer to its open bottom end. The ring plate 31 is also shaped like an unfolded fan, extending along the flange 30 with a certain interval interposed between them, and fixed to the extended portion 15b of the stationary structure 15. The jacket 32 is made integral to the auxiliary jacket ring 33. The outer opening H is separated from the outlet opening E by a sharply-pointed outer circumferential rim 30a of the flange 30 when viewed from the hollow portion S in side the jacket 32. It is preferable that the inner circumference surface of the jacket 32 which encloses the hollow portion S is made of such a material that is easily made wet by and fully reacts to the liquid metal lubricant. The porous matter made of such a material that fully reacts to the lubricant at the surface thereof may be arranged in the hollow portion S inside the jacket 32.

Figure 4:
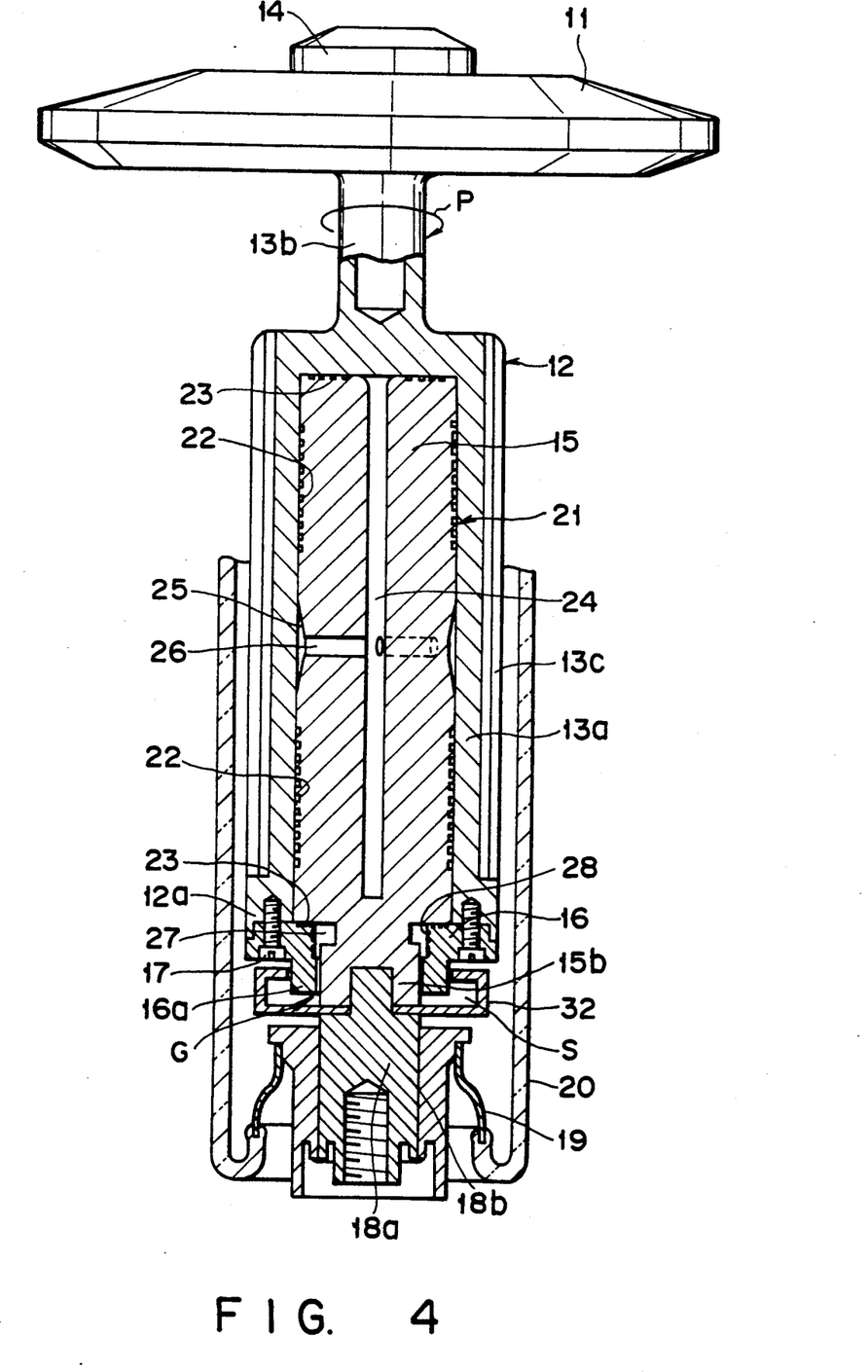
FIG. 4 is a vertical sectional view showing the rotary anode type X-ray tube according to a yet another embodiment of the present invention.
Figure 5:
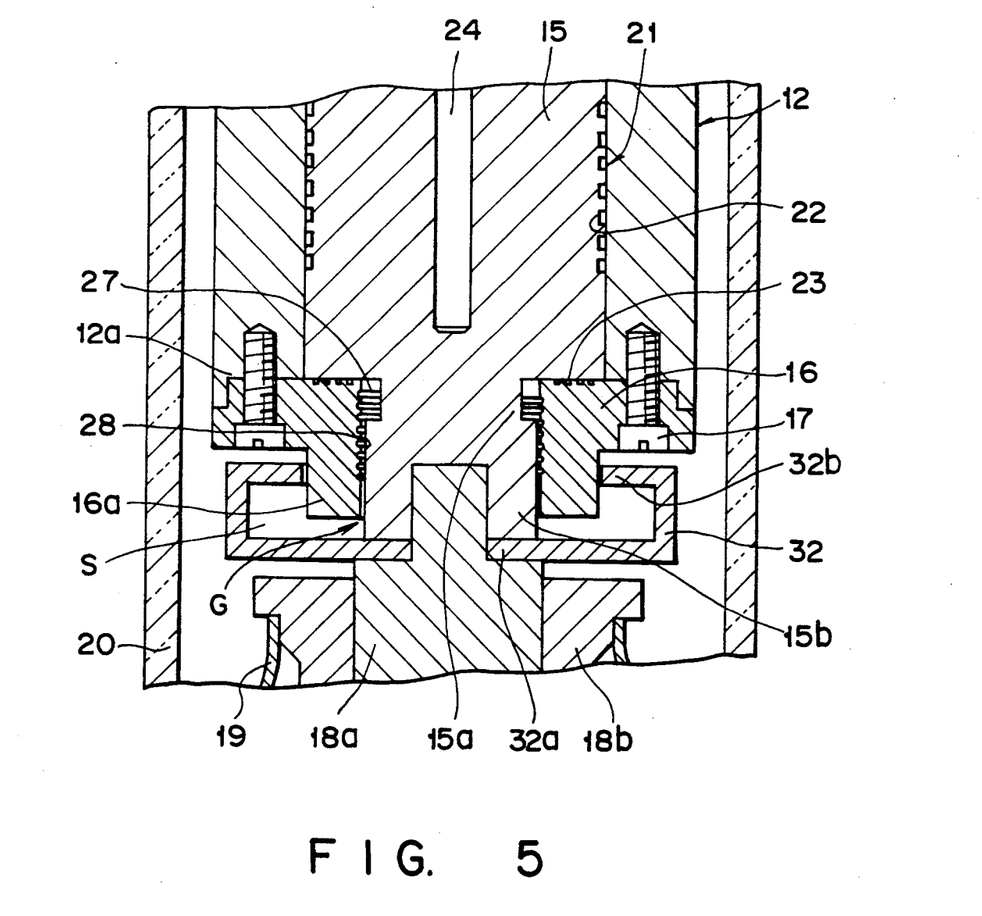
FIG. 5 is an enlarged view showing a part of the rotary anode type X-ray tube shown in FIG. 4.

In a X-ray tube, as shown in FIGS. 4 and 5, the jacket 32 is fixed to the extended portion 15b of the stationary structure 15, enclosing the relatively thick cylindrical portion 16a of the closing ring 16. The jacket 32 is shaped like a fallen U when sectioned in half, with its center portion 32a sandwiched and welded between the extended portion 15b of the stationary structure 15 and the anode support 18a and with its large-diameter opening 32b kept separated from and adjacent to the outer circumference of the cylindrical portion 16a of the closing ring 16. The inner circumference of the jacket 32 is made of such a material that is easily made wet by and fully reacts with the liquid metal lubricant. The porous matter made of such a material that fully reacts with the lubricant at the surface thereof may be arranged in the hollow portion S inside the jacket 32. Even if the lubricant is leaked out from the clearance between the small-diameter portion of the stationary structure and the cylindrical portion of the closing ring and is scattered into the hollow portion inside the jacket 32, it can be kept in the hollow portion and prevented from scattering into the space in the vacuum envelope of the X-ray tube.

Figure 6:
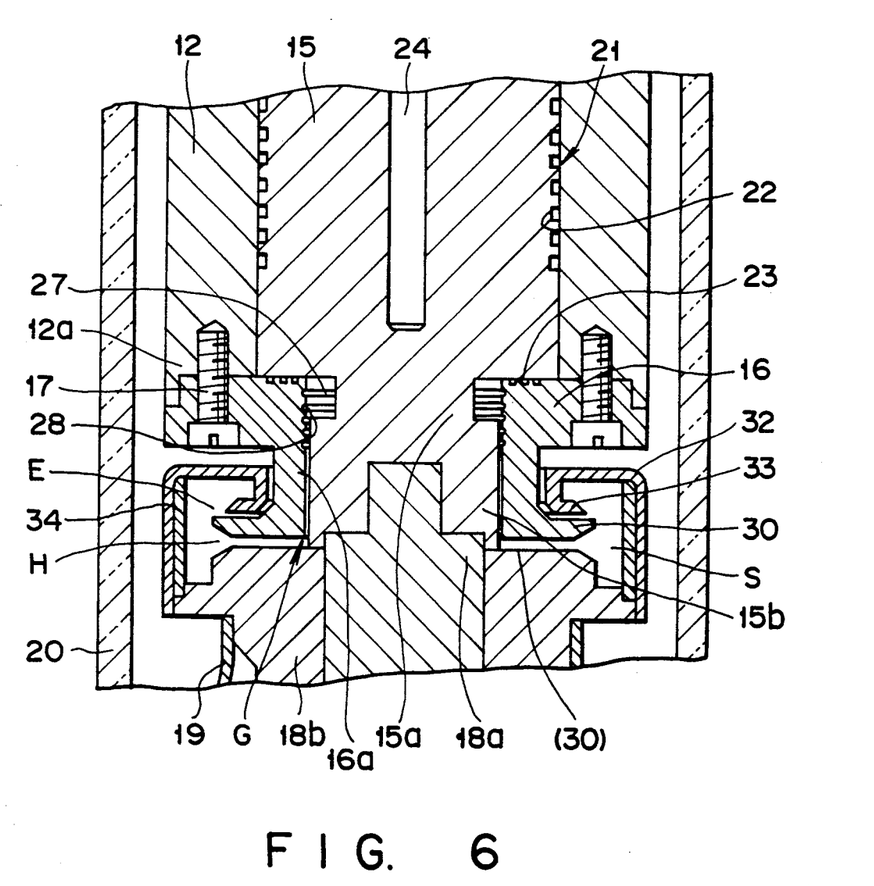
FIG. 6 is an enlarged vertical sectional view showing the main portion of the rotary anode type X-ray tube according to a further embodiment of the present invention.

In a X-ray tube, as shown in FIG. 6, the flange 30 is projected from the bottom end of the cylindrical portion 16a of the closing ring 16 in a direction perpendicular to the axis of the X-ray tube and the end portion 31a of the anode support 18b which forms a part of the extended portion of the stationary structure 15 is extended in the same direction, while being kept separated from and adjacent to the flange 30, to serve as the ring plate 31 in the above-described embodiments. Further, the top of the jacket 32 is bent inward to form the auxiliary jacket ring 33. According to this embodiment, its structure can be made relatively simpler, the number of parts used can be reduced and its assembly can be made easier.

Figure 7:
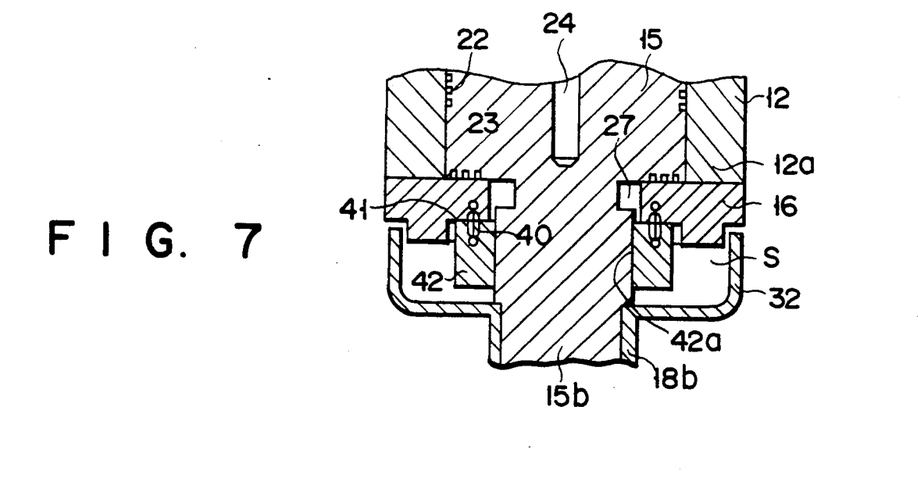
FIG. 7 is a vertical sectional view showing a main portion of the rotary anode type X-ray tube according to a further embodiment of the present invention.

In a X-ray tube shown in FIG. 7, a closing ring 16 has a circumferential stepped face 41, and a seal ring 42 with which lubricant is prevented from being leaked on the stepped face 41. The seal ring 42 is in tight contact with the stepped face 41 by means of a plurality of spring wires 40, and is rotatable with its inner circumferential face 42a fight contacted with the extended portion 15b and sliding on the extended portion 15b of a stationary structure. The seal ring 42 is preferably formed of material which has a self-lubricating characteristic like molybdenum disulfide and which withstands abrasion. A jacket 32 is arranged in such a manner as to cover the seal ring 42, and is fixed to the extended portion 15b of the stationary structure.

Figure 8:
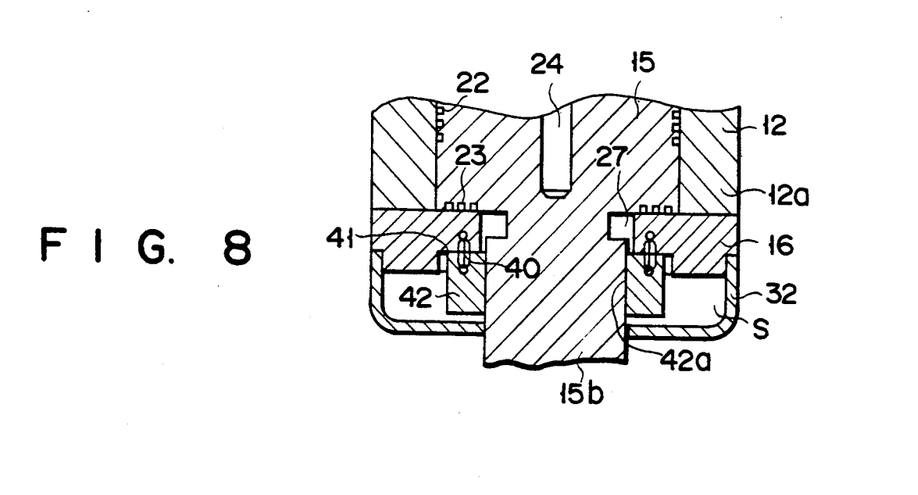
FIG. 8 is a vertical sectional view showing a main portion of the rotary anode type X-ray tube according to another embodiment of the present invention.

In a X-ray tube shown in FIG. 8, a jacket 32, with which to cover a seal ring 42, is fixed to a closing ring 16, and is rotatable together with the closing ring 16.

Figure 9:
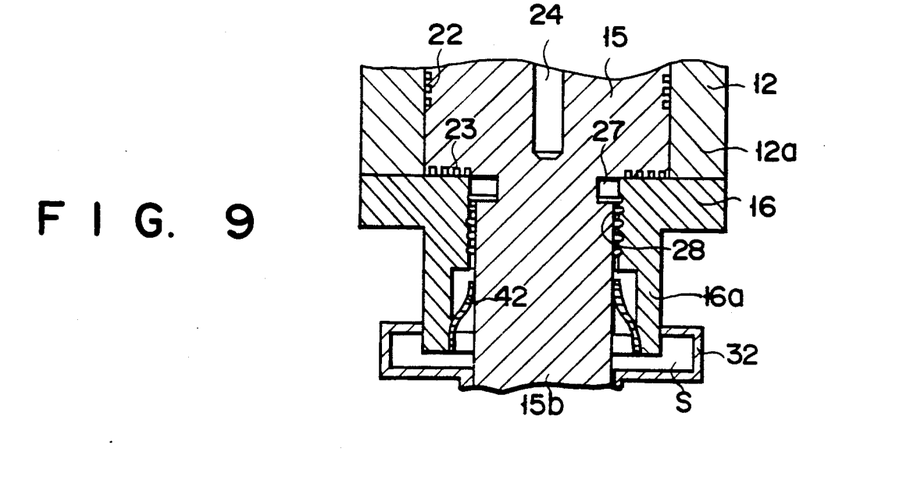
FIG. 9 is a vertical sectional view showing a main portion of the rotary anode type X-ray tube according to another embodiment of the present invention.

In a X-ray tube shown in FIG. 9, a seal ring 42 is made by a thin metal cylindrical member which is elastic and satisfactory in anti-abrasion characteristic. The seal ring 42 is secured to the inner circumferential surface of the cylindrical portion 16a of a closing ring 16 and is tapered. The inner circumferential face of the tip end portion of the seal ring 42 is in contact with that portion of the outer circumferential surface of the extended portion 15b. In this state, the seal ring 42 is rotatable.

Figure 10:
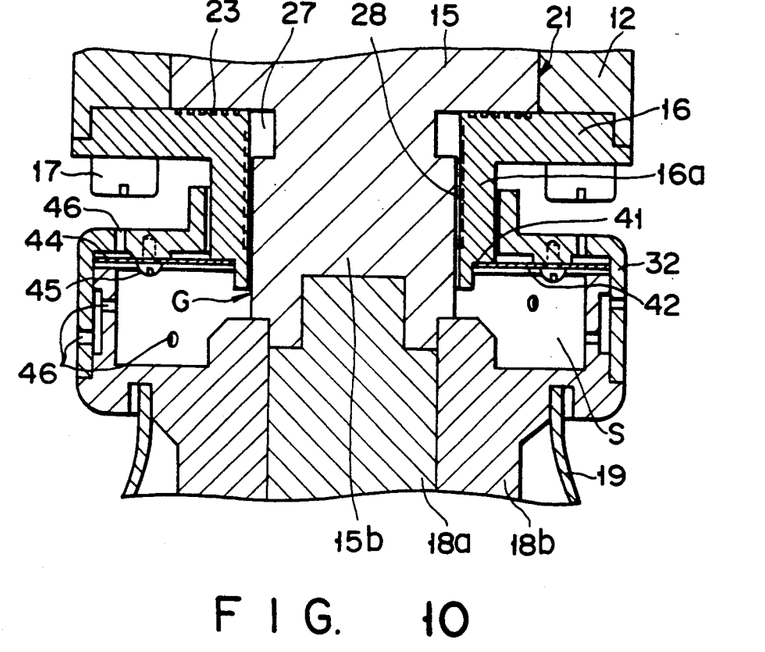
FIG. 10 is an enlarged vertical sectional view showing a main portion of the rotary anode type X-ray tube according to a further embodiment of the present invention.
Figure 11:
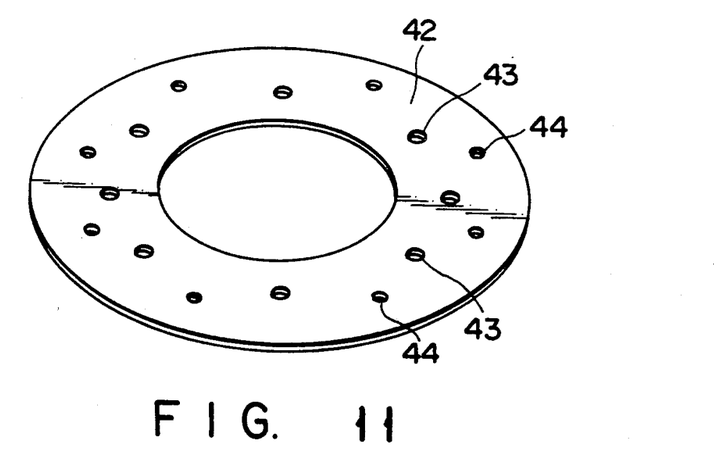
FIG. 11 is a perspective view showing a ring plate shown in FIG. 10

In a rotary anode type X-ray tube shown in FIGS. 10 and 11, a circumferential stepped face 41 is formed on the lower and outer circumference of the cylindrical portion 16a of the closing ring 16 and a seal ring 42 such as a thin ring plate is contacted with the stepped face 41 at the inner rim portion thereof. The seal ring 42 is made of an anti-abrasion and relatively elastic material such a tungsten and has a thickness of about 30 μm. It has a plurality of fixing and ventilating holes 43 and 44 and it is, fixed to the inner wall of the jacket 32 by a plurality of bolts 45. It is contacted with the stepped face 41 of the cylindrical portion 16a of the closing ring 16 while being slightly pushed against the stepped face 41 by its own elasticity. When arranged in this manner, there is no fear that the lubricant is leaked into the space in the vacuum envelope even if a part of the lubricant leaks into the hollow portion inside the jacket through the clearance opening G, because the thin seal ring 42 contacts the stepped face 41 provided on the side of the rotary structure 12 to close the hollow portion in the jacket 32. The jacket 32 is provided with plural ventilation holes 46 which are shifted from one another. These ventilation holes 46 serve to exhaust gas produced in the bearing section 21 and discharged through the clearance opening G, but they are positioned not to allow the lubricant to pass through them. The seal ring 42 may have such a surface layer that can repel the lubricant and when arranged in this manner, the outside leakage of the lubricant can be more reliably prevented. The inner wall of the jacket 32 may be made of such a material that fully reacts with the lubricant or the porous matter made of such a material that fully reacts to the lubricant at the surface thereof may be arranged in the hollow portion S inside the jacket 32.

Figure 12:
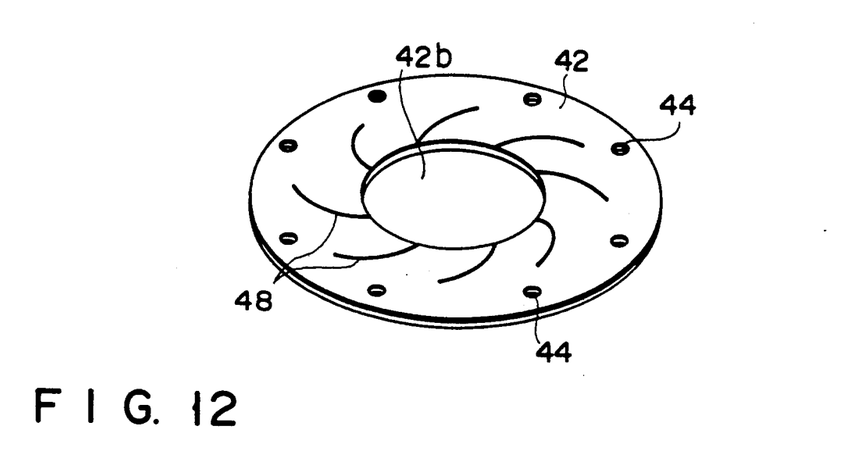
FIG. 12 is a perspective view showing a seal ring incorporated in an X-ray tube according to a further embodiment of the invention.
Figure 13:
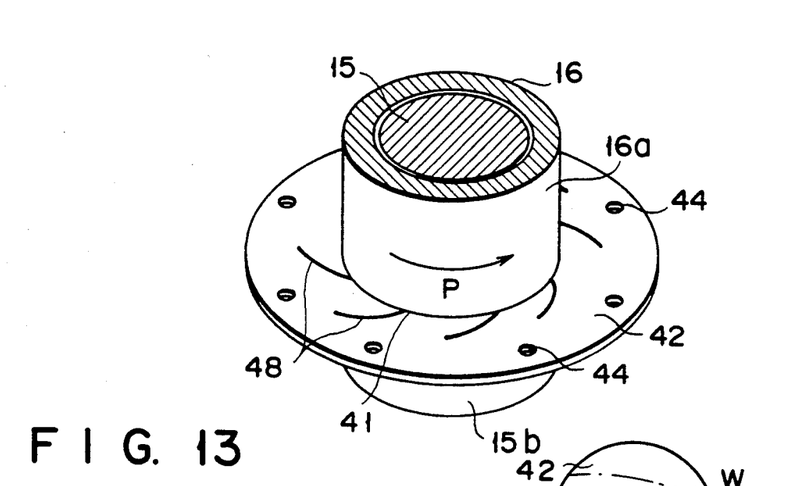
FIG. 13 is a perspective cross-sectional view showing a rotary structure provided with the seal ring shown in FIG. 12.

In a X-ray tube shown in FIGS. 12 and 13, a seal ring 42 has a plurality of spiral slits 48 extending from a central hole 42b in a radial direction. Each of the slits 48 has a width of 10 to 50 μm. A cylindrical 16a portion has a stepped surface 41, which contacts with the center portion of the seal ring 42 while rotating. The slits 48 make an angle with the inner surface of the seal ring 42 such that a liquid metal lubricant interposed between the seal ring 42 and the cylindrical portion 16a is prevented from flowing outward due to centrifugal force while the closing cylinder is rotating. The seal ring 42 has such a satisfactory spring action owing to the existence of the slits 48 that it touches the stepped surface 41 of the closing cylinder 16a with suitable force.

Figure 14:
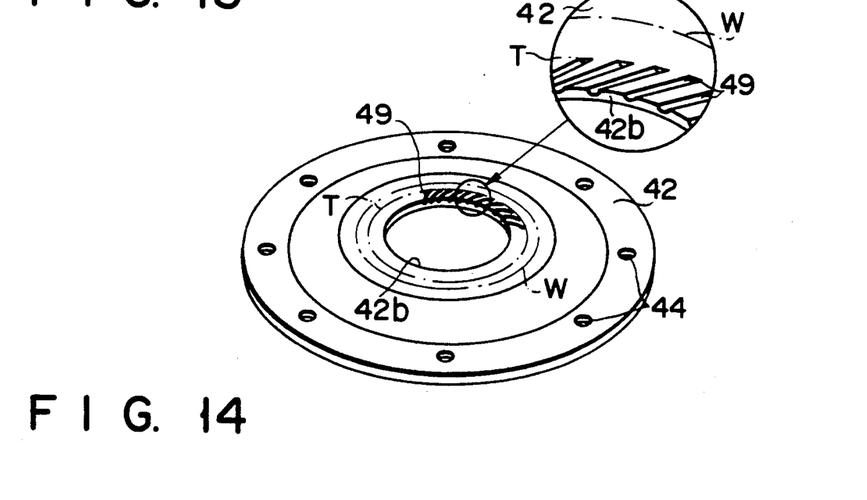
FIG. 14 is a perspective view showing another seal ring incorporated in a X-ray tube according to a further embodiment of the invention.

In a X-ray tube shown in FIG. 14, a seal ring 42 has a number of spiral slits 49 extending from a central hole 42b to an intermediate portion T between the hole 42a and a contact portion W which is to be brought into contact with the cylindrical portion 16a. In this structure, lubricant is prevented from leaking by virtue of the flat contact region (the region between T and W), when the cylinder is stopped. When the cylinder is rotating at a high speed, the lubricant is prevented from leaking owing to the lubricant forcing function of the spiral slits 49 in addition to the flat contact region. The center portion of the seal ring 42 is slightly projected toward the cylindrical portion 16a, thereby increasing the spring action.

Figure 15:
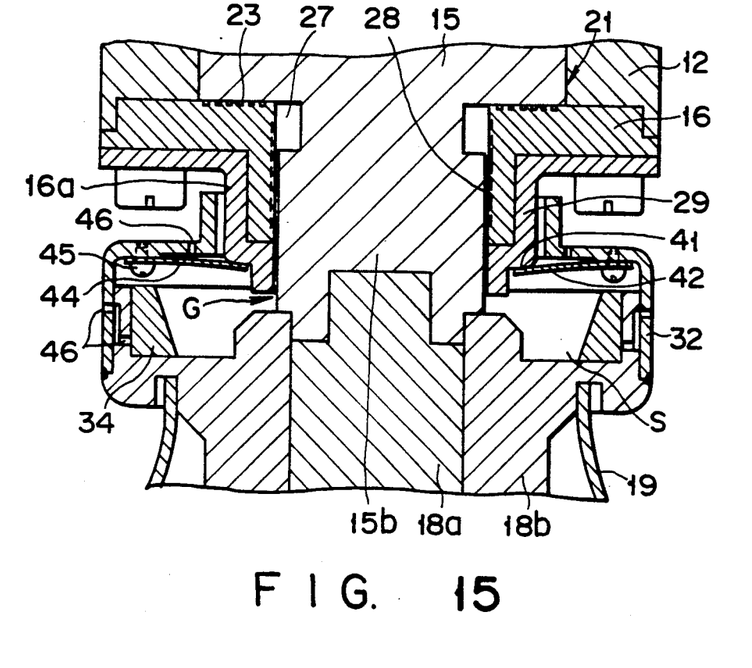
FIG. 15 is an enlarged vertical sectional view showing a main portion of the rotary anode type X-ray tube according to a further embodiment of the present invention.

In a rotary anode type X-ray tube shown in FIG. 15, the stepped face 41 is formed on the lower and outer circumference of the auxiliary rotating cylinder 29, and the seal ring 42 which is made of the lubricant repelling material is contacted with the stepped face 41. In addition, the porous matter 34, is arranged inside the ventilation holes 46. When arranged in this manner, the embodiment can prevent the leakage of the lubricant while exhausting gas outside.

Figure 16:
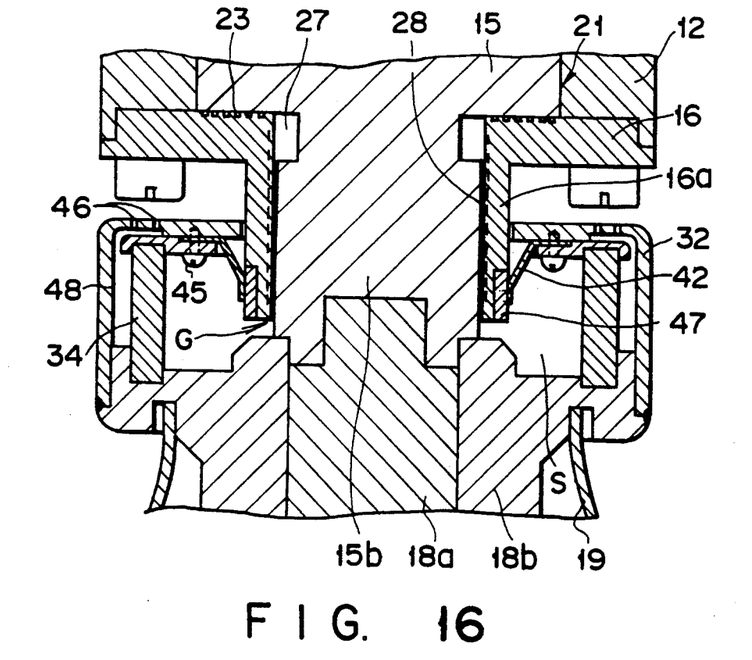
FIG. 16 is an enlarged vertical sectional view showing the main portion of the rotary anode type X-ray tube according to a further embodiment of the present invention.

In a rotary anode type X-ray tube shown in FIG. 16, a seal ring 42 formed as a tapered thin ring plate is elastically contacted with the outer circumference of the cylindrical portion 16a of the closing ring 16. More specifically, a cylinder 47 made of a self-lubricating material such as molybdenum disulfide is fixedly bonded to the outer circumference of the cylindrical portion 16a and the thin seal ring 42 is contacted with this self-lubricating cylinder 47 to allow the rotary structure 12 to be smoothly rotated. A space 48 is formed between the inner wall of the jacket and the cylindrical porous matter 34 arranged in the hollow portion S inside the jacket. The ventilation holes 46 are formed at the top of the jacket 32, communicating with the space 48. When arranged in this manner, the embodiment can achieve more better gas exhaustion and lubricant leakage prevention.

Figure 17:
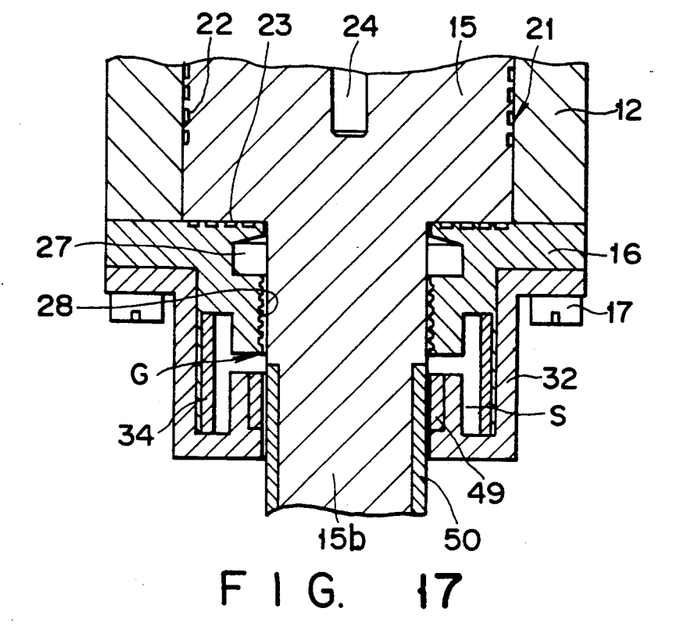
FIG. 17 is an enlarged vertical sectional view showing a main portion of the rotary anode type X-ray tube according to a further embodiment of the present invention.

In a rotary anode type X-ray tube shown in FIG. 17, the jacket 32 is fixed to the closing ring 16 which is provided with the spiral groove 23 for thrust bearing, the circumferential groove 27 and the spiral groove 28. The jacket 32 which is combined with the closing ring 16 to form a part of the rotary structure 12 has a ring 49, which is made of a lubricant-repelling material, on its inner circumference which is adjacent to the clearance opening G. A cylinder 50 similarly made of the lubricant-repelling material is fixed to the outer circumference of the extended portion 15b positioned inside the ring 49. This assembly of these ring 49 and cylinder 50 between which a small clearance is formed allows gas to pass therethrough but repels the lubricant not to pass therethrough.

Figure 18:
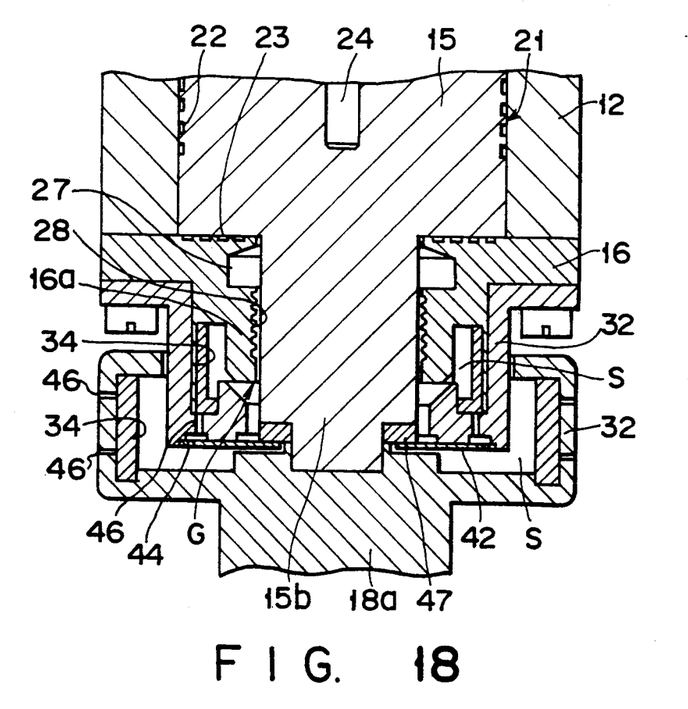
FIG. 18 is an enlarged vertical sectional view showing a main portion of the rotary anode type X-ray tube according to a further embodiment of the present invention.

In a X-ray tube shown in FIG. 18, a first jacket 32 is fixed to the closing ring 16 of the rotary structure 15 and a second jacket 32 is attached to the extended portion 15b. The porous matters 34 are arranged in the hollow portions S, respectively, inside both of the jackets 32. The ring 47 made of a self-lubricating material is fixed to the extended portion 15b and the rotary structure 12 is rotated while keeping the thin ring plate 42 contacted with the ring 47. When the embodiment is arranged in this manner, the number of parts used is slightly increased but a far better lubricant leakage prevention ca be achieved.

Figure 19:
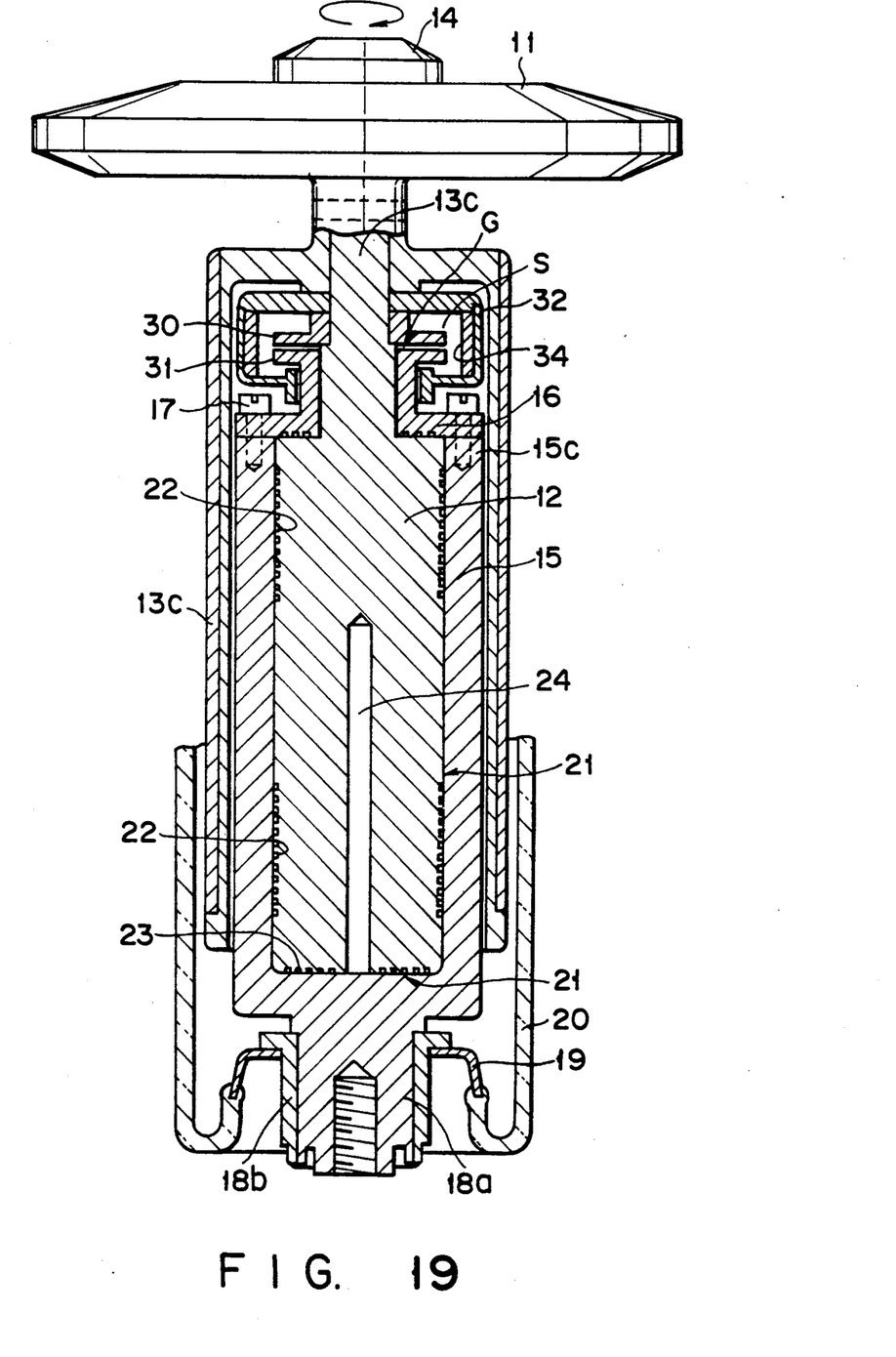
FIG. 19 is a vertical sectional view showing the rotary anode type X-ray tube according to a further embodiment of the present invention.

In a X-ray tube shown in FIG. 19, the rotary structure 12 shaped substantially like a column is located on the center axis of the X-ray tube and the stationary structure 15 shaped like a cylinder having a bottom section into which the rotary structure 12 is inserted. The closing ring 16 is fixed to an opening portion 15c of the stationary structure 15. On the other hand, the jacket 32 is attached to the rotary structure 12, enclosing the clearance opening G. A rotor cylinder 13c is fixed to the rotating shaft 13b.

According to the present invention as described above, the liquid metal lubricant leaked from the bearing section can be more reliably caught and prevented by the inner wall of a matter in the hollow portion inside the jacket from being scattered into the space in the vacuum envelope of the X-ray tube. Therefore, a rotary X-ray tube of the anode type is capable of keeping its voltage-withstanding quality unchanged and achieving a more reliable slide bearing operation of the dynamic pressure type for a longer time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rotary anode type X-ray tube comprising:
   an anode target,
   a rotary structure, said rotary structure comprising a rotating shaft to which the anode target is fixed;
   a stationary structure coaxially arranged with the rotary structure with a clearance opening between said rotary structure and said stationary structure,
   a slide bearing section provided between the rotary structure and the stationary structure and having spiral grooves;
   a liquid metal lubricant applied to the slide bearing section between the rotary structure and the stationary structure;
   a vacuum envelope defining a space in which the anode target, the rotary structure, the stationary structure, the slide bearing section and the liquid metal lubricant are arranged;
   enclosing means, having a hollow space communicating with the clearance opening, for enclosing the clearance opening to prevent the lubricant from being scattered into the vacuum space from the hollow space;
   wherein one of the rotary structure and the stationary structure is of cylindrical shape having a wall section, a closed bottom section and an open top section so as to receive another of the rotary structure and the stationary structure, and the other of the rotary structure and the stationary structure is shaped like a column and fitted within the one of the rotary structure and the stationary structure.

2. The rotary anode type X-ray tube according to claim 1, wherein the enclosing means comprises a jacket having an inner wall communicating with said hollow space and being attached to at least one of the rotary and stationary structures, and at least a part of the inner wall being made of such a material that reacts to the liquid metal lubricant.

3. The rotary anode type X-ray tube according to claim 1, further comprising a porous matter located in the hollow space and made of such a material that reacts to the liquid metal lubricant at the surface thereof.

4. The rotary anode type X-ray tube according to claim 1, wherein the enclosing means comprises a seal ring fixed to one of the rotary structure and the stationary structure and in contact with both the rotary structure and the stationary structure.

5. The rotary anode type X-ray tube according to claim 1, wherein the enclosing means has ventilation paths for permitting a gas to pass therethrough.

6. The rotary anode type X-ray tube according to claim 1, further comprising a closing ring arranged at the open top section of the cylinder.

7. The rotary anode type X-ray tube according to claim 1, further comprising means for defining a path communicating the clearance opening to the hollow space and extending along a radial direction of the rotary structure, said means for defining a path being fixed to the rotary structure and rotated with the rotary structure.

* * * * *